US011921966B2

(12) United States Patent
Rudchenko et al.

(10) Patent No.: US 11,921,966 B2
(45) Date of Patent: *Mar. 5, 2024

(54) INTELLIGENT RESPONSE USING EYE GAZE

(71) Applicant: Microsoft Technology Licensing, LLC, Redmond, WA (US)

(72) Inventors: Dmytro Rudchenko, Bellevue, WA (US); Eric N. Badger, Redmond, WA (US); Akhilesh Kaza, Sammamish, WA (US); Jacob Daniel Cohen, Seattle, WA (US); Harish S. Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,753

(22) Filed: Jan. 31, 2022

(65) Prior Publication Data

US 2022/0155911 A1   May 19, 2022

Related U.S. Application Data

(63) Continuation of application No. 15/840,562, filed on Dec. 13, 2017, now Pat. No. 11,237,691.

(Continued)

(51) Int. Cl.
*G06F 3/0481* (2022.01)
*G06F 3/01* (2006.01)
(Continued)

(52) U.S. Cl.
CPC ............ *G06F 3/0481* (2013.01); *G06F 3/013* (2013.01); *G06F 3/0237* (2013.01);
(Continued)

(58) Field of Classification Search
CPC ...... G06F 3/0481; G06F 3/013; G06F 3/0237; G06F 3/04842; G06F 3/04886; G06F 40/274; G06N 20/00
See application file for complete search history.

(56) References Cited

U.S. PATENT DOCUMENTS

| 6,873,314 | B1 | 3/2005 | Campbell et al. |
| 10,114,463 | B2 | 10/2018 | Cheon et al. |

(Continued)

FOREIGN PATENT DOCUMENTS

WO   2010118292 A1   10/2010

OTHER PUBLICATIONS

"Non Final Office Action Issued in U.S. Appl. No. 17/588,807", dated Mar. 14, 2023, 12 Pages.

(Continued)

*Primary Examiner* — Phenuel S Salomon

(57) ABSTRACT

Systems and methods related to intelligent typing and responses using eye-gaze technology are disclosed herein. In some example aspects, a dwell-free typing system is provided to a user typing with eye-gaze. A prediction processor may intelligently determine the desired word or action of the user. In some aspects, the prediction processor may contain elements of a natural language processor. In other aspects, the systems and methods may allow quicker response times from applications due to application of intelligent response algorithms. For example, a user may fixate on a certain button within a web-browser, and the prediction processor may present a response to the user by selecting the button in the web-browser, thereby initiating an action. In other example aspects, each gaze location may be associated with a UI element. The gaze data and associated UI elements may be processed for intelligent predictions and suggestions.

20 Claims, 11 Drawing Sheets

Related U.S. Application Data

(60) Provisional application No. 62/537,427, filed on Jul. 26, 2017.

(51) Int. Cl.
*G06F 3/023* (2006.01)
*G06F 3/04842* (2022.01)
*G06F 3/04886* (2022.01)
*G06F 40/274* (2020.01)
*G06N 20/00* (2019.01)

(52) U.S. Cl.
CPC ...... *G06F 3/04842* (2013.01); *G06F 3/04886* (2013.01); *G06F 40/274* (2020.01); *G06N 20/00* (2019.01)

(56) References Cited

U.S. PATENT DOCUMENTS

| | | | |
|---|---|---|---|
| 10,701,426 | B1 | 6/2020 | Van Hoff et al. |
| 2007/0156723 | A1 | 7/2007 | Vaananen |
| 2011/0111384 | A1 | 5/2011 | Dietrich et al. |
| 2011/0175932 | A1 | 7/2011 | Yu et al. |
| 2012/0019662 | A1 | 1/2012 | Maltz |
| 2012/0075168 | A1* | 3/2012 | Osterhout ............... G06F 3/017 345/8 |
| 2012/0105486 | A1* | 5/2012 | Lankford ............... G06F 3/005 348/78 |
| 2013/0145304 | A1 | 6/2013 | DeLuca et al. |
| 2014/0002341 | A1* | 1/2014 | Nister .................. G06F 3/0237 345/156 |
| 2014/0237411 | A1* | 8/2014 | Pasquero ............ G06F 3/04886 715/773 |
| 2014/0365878 | A1* | 12/2014 | Dai .................... G06F 3/04883 715/256 |
| 2015/0015483 | A1 | 1/2015 | Leigh et al. |
| 2015/0130740 | A1 | 5/2015 | Cederlund |
| 2015/0268821 | A1 | 9/2015 | Lee et al. |
| 2015/0317069 | A1* | 11/2015 | Clements ........... G06F 3/04842 715/773 |
| 2015/0338915 | A1 | 11/2015 | Publicover et al. |
| 2016/0025971 | A1 | 1/2016 | Crow |
| 2016/0299685 | A1 | 10/2016 | Zhai et al. |
| 2017/0153701 | A1 | 6/2017 | Mahon |
| 2017/0212663 | A1 | 7/2017 | Breedvelt-Schouten |
| 2017/0322623 | A1 | 11/2017 | Mckenzie et al. |
| 2017/0351402 | A1 | 12/2017 | Yoakum |
| 2018/0329727 | A1 | 11/2018 | Cao et al. |
| 2019/0034038 | A1 | 1/2019 | Rudchenko et al. |
| 2019/0034057 | A1 | 1/2019 | Rudchenko et al. |
| 2019/0377477 | A1 | 12/2019 | Haist |

OTHER PUBLICATIONS

Interview Summary for co-pending U.S. Appl. No. 17/588,807 dated Jun. 12, 2023.

"Final Office Action Issued in U.S. Appl. No. 17/588,807", dated Aug. 31, 2023, 11 Pages.

Non-Final Office Action dated Dec. 15, 2023, in U.S. Appl. No. 17/588,807, 12 pages.

* cited by examiner

INTELLIGENT RESPONSE USING EYE GAZE

CROSS-REFERENCE TO RELATED APPLICATIONS

This application is a continuation of application Ser. No. 15/840,562, filed Dec. 13, 2017, which application claims the benefit of provisional application Ser. No. 62/537,427, entitled "INTELLIGENT RESPONSE USING EYE GAZE," filed Jul. 26, 2017, which applications are incorporated herein by reference in its entirety.

BACKGROUND

Eye gaze or eye tracking is a way of accessing an electronic device or communication aid using an input device (e.g., mouse) that is controlled by a user's eye or eyes. Eye-gaze interaction techniques may enable users to communicate and interact with electronic devices without the use of hands and fingers for typing. For example, users with certain motor disabilities may be able to communicate with eye gaze technology. Currently, the primary technique used for gaze communication is eye-typing. To eye-type, a user looks at a letter on an on-screen keyboard. If the user's gaze remains fixed on the same letter for a set time period (the dwell-timeout), the system recognizes a user selection of that letter. Unfortunately, even the best eye-typing systems are relatively slow with reported entry rates ranging from 7-20 words per minute, with a plateau of roughly 23 words per minute. Such dwell-based eye-typing techniques may result in unsatisfactory delays and/or user fatigue.

It is with respect to these and other general considerations that example aspects, systems, and methods have been described. Also, although relatively specific problems have been discussed, it should be understood that the examples should not be limited to solving the specific problems identified in the background.

SUMMARY

Implementations described and claimed herein address the foregoing problems by providing an intelligent, dwell-free eye gaze input system. Rather than independently focusing on each letter to form a word (i.e., "dwell"), the example embodiments disclosed herein use predictive text and machine-learning algorithms to predict words based on noisy eye-gaze input. In this way, a user is not required to fixate for extended amounts of time, but rather can quickly glance at letters that form a desired word. In some example aspects, a visual trace may be drawn on the screen that follows a path of eye movements to provide feedback to the user. In other example aspects, a user may input a word by looking at the first and last letter of that word, and machine-learning algorithms may predict the desired word according to but not limited to contextual information, historical typing patterns, fuzzy-matching algorithms, and other intelligent data.

A processor-implemented method for providing intelligent eye-gaze input is disclosed herein. The method includes receiving eye-gaze input on an electronic device and determining at least one gaze location associated with the eye-gaze input. The method further includes applying at least one machine-learning algorithm to the at least one gaze location and, based on the application of the at least one machine-learning algorithm, predicting at least one response. Additionally, the method includes providing the at least one predicted response and receiving an indication related to the at least one predicted response. Based on the indication, the method includes performing at least one action.

In another aspect, a computing device is provided, the computing device comprising at least one processing unit and at least one memory storing processor-executable instructions that when executed by the at least one processing unit cause the computing device to receive eye-gaze input on an electronic device. Additionally, the computing device determines at least one gaze location associated with the eye-gaze input and associates at least one UI element with the at least one gaze location. The computing device also applies at least one machine-learning algorithm to the at least one gaze location, and based on the application of the at least one machine-learning algorithm, predicts at least one response. The computing device provides the at least one predicted response, receives an indication related to the at least one predicted response, and based on the indication, performs at least one action.

In yet another aspect, a processor-readable storage medium is provided, the processor-readable storage medium storing instructions for execution by one or more processors of a computing device, the instructions for performing a method for analyzing eye-gaze input. The method includes receiving eye-gaze input on an electronic device, determining at least one gaze location associated with the eye-gaze input, and applying at least one machine-learning algorithm to the at least one gaze location. Additionally, based on the application of the at least one machine-learning algorithm, the method includes predicting at least one response. Furthermore, the method includes providing the at least one predicted response, receiving an indication related to the at least one predicted response, and based on the indication, performing at least one action.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
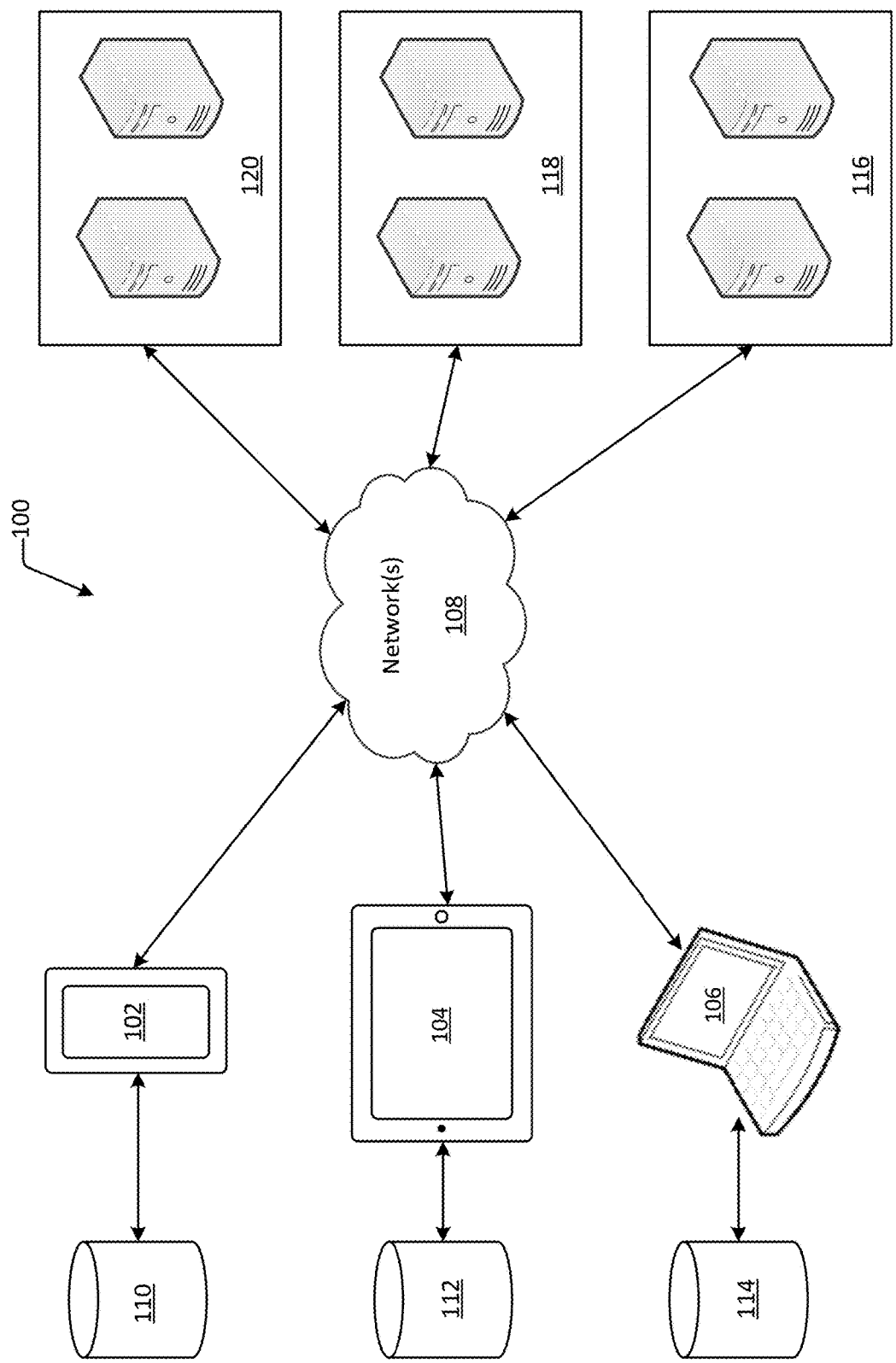
FIG. 1 illustrates an example of a distributed system for implementing an intelligent eye-gaze response.

In the following detailed description, reference is made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

Implementations described and claimed herein describe example aspects of an intelligent, dwell-free, eye-gaze input system. In aspects, eye gaze is a continuous signal with no specific indication of when a user intends to start and stop typing (unlike specific button presses on a physical keyboard or finger touches on a virtual keyboard). Thus, the system identifies an indication of when a user wishes to start typing a word and when typing is completed. In one aspect, rather than detecting the user independently focusing on each letter to form a word (i.e., using "dwell"), example embodiments disclosed herein use predictive text and machine-learning algorithms to predict words based on "noisy" eye-gaze input. "Noisy" eye-gaze input may refer to a plurality of gaze locations recorded by an eye-gaze tracker. Standard eye gaze trackers may have a sampling rate of 60 Hz, which translates to approximately one data point every 16.67 milliseconds. An eye gaze may be inherently jittery, and as a result, the recorded gaze locations may be non-uniform or scattered. This "noisy" eye gaze input may be addressed by the intelligent typing and response system disclosed herein. In aspects, the intelligent eye-gaze response system may use a natural language processor to predict a desired word of the user. By using a natural language processor and by accounting for gaze location errors, the intelligent typing and response system disclosed herein may be referred to as "dwell-free." Dwell-free refers to a system that does not rely on dwell time for identifying a desired letter or word of a user. With the present disclosure, a user no longer needs to fix a gaze for extended amounts of time on specific characters, but rather can quickly glance at one or more letters that form a desired word or parts of a desired word. The intelligent typing and response system receives the eye-gaze input, processes the input through a natural-language processor, and predicts one or more words that the user may subsequently select or discard.

The intelligent eye-gaze response system disclosed herein may be implemented with an eye-tracker hardware device that is able to record a plurality of gaze location points within milliseconds. Current eye-gaze typing solutions are slow due to the tedious and frustrating dwell-time requirements. The present disclosure describes quickly analyzing eye-gaze input to identify desired words for typing without reliance on dwell time. As such, the present system and methods increase the speed with which an individual is able to type using eye gaze, decreasing user frustration and fatigue.

FIG. 1 illustrates an example of a distributed system for implementing an intelligent eye-gaze response.

A system implementing an intelligent eye-gaze response may be executed on electronic devices including but not limited to client devices such as mobile phone 102, tablet 104, and personal computer 106. The disclosed system may receive eye-gaze input data while running an application including but not limited to a text messaging application, an electronic mail application, a search engine application, and any other application that has a text input option, such as any web browser application. The disclosed system may then process the eye-gaze input locally, remotely, or using a combination of both. During processing, the disclosed system may rely on local and/or remote databases to generate a predicted word or other action response to provide back to the user. This may be accomplished by utilizing local data (e.g., local datasets 110, 112, 114) stored in local databases associated with client devices 102, 104, 106, and/or remote databases stored on or associated with servers 116, 118, 120, or a combination of both.

For example, mobile phone 102 may utilize local dataset 110 and access servers 116, 118 and/or 120 via network(s) 108 to process the eye-gaze input data and provide an appropriate predicted word or other action response back to the user. In other example aspects, tablet 104 may utilize local database 112 and network(s) 108 to synchronize the relevant tokens and features extracted from the processed eye-gaze input data and the subsequent predicted word or other action response that is provided back to the user across client devices and across all servers running the intelligent eye-gaze response system. For example, if the initial eye-gaze input is received on tablet 104, the eye-gaze input data and subsequent predicted word or action response may be saved locally in database 112, but also shared with client devices 102, 106 and/or servers 116, 118, 120 via the network(s) 108.

In other example aspects, the intelligent eye-gaze response system may be deployed locally. For instance, if the system servers 116, 118, and 120 are unavailable (e.g., due to network 108 being unavailable or otherwise), the intelligent eye-gaze response system may still operate on a client device, such as mobile device 102, tablet 104, and/or computer 106. In this case, a subset of the trained dataset applicable to the client device type (e.g., mobile device, tablet, laptop, personal computer, etc.) and at least a client version of the machine-learning algorithms may be locally cached so as to automatically respond to relevant tokens and features extracted from eye-gaze input data on the client device. The system server 116, 118, and 120 may be unavailable by user selection (e.g., intentional offline usage) or for a variety of other reasons, including but not limited to power outages, network failures, operating system failures, program failures, misconfigurations, hardware deterioration, and the like.

As should be appreciated, the various methods, devices, components, etc., described with respect to FIG. 1 are not intended to limit systems 100 to being performed by the particular components described. Accordingly, additional topology configurations may be used to practice the methods and systems herein and/or components described may be excluded without departing from the methods and systems disclosed herein.

Figure 2:
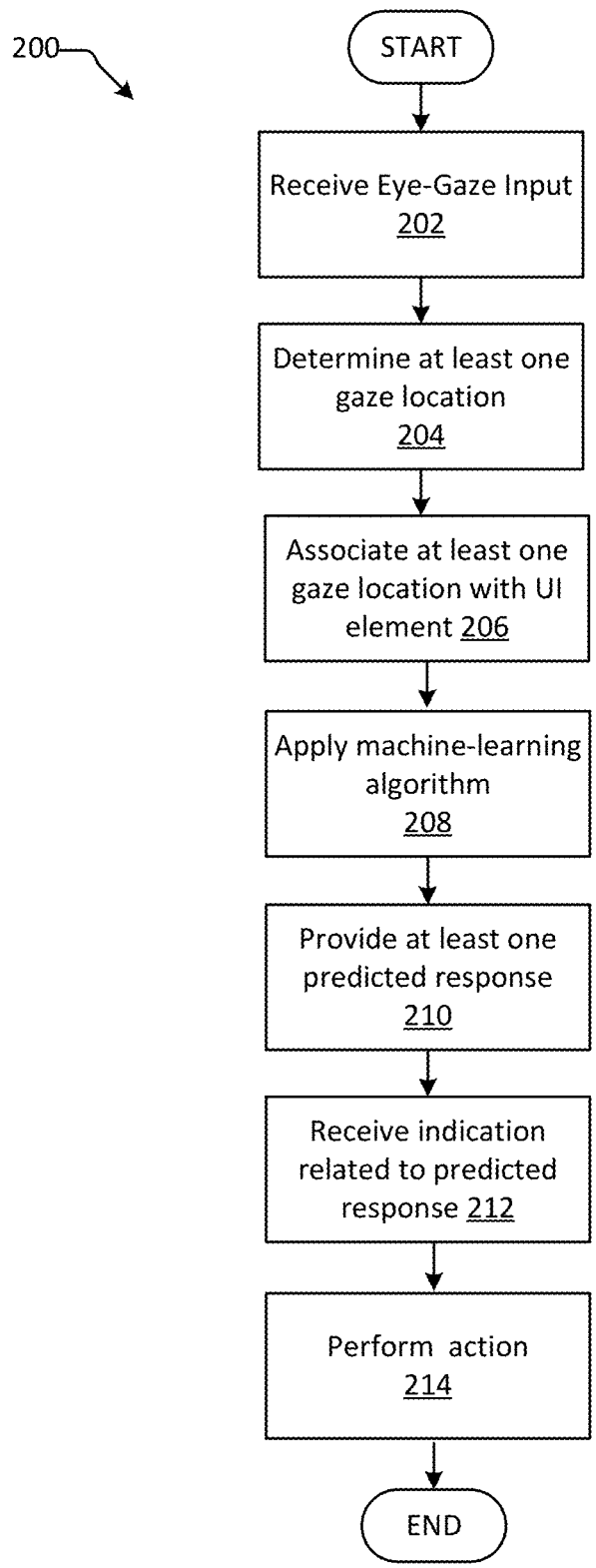
FIG. 2 is a block diagram illustrating a method for an intelligent eye-gaze response.

FIG. 2 is a block diagram illustrating a method for intelligent typing using eye gaze.

Method 200 may begin with receive eye-gaze input operation 202. Method 200 may rely on eye-gaze tracker hardware that can record a plurality of gaze locations in milliseconds. At operation 202, the eye-gaze input may be received through the eye-gaze tracker hardware and sent to the intelligent eye-gaze response system for processing.

At determination operation 204, at least one gaze location may be determined. As mentioned previously, the eye-gaze tracker hardware has the capability of detecting a plurality of gaze locations within a short period of time.

At associate operation 206, the at least one gaze location may be analyzed and associated with at least one UI element. For example, the analysis may comprise receiving a specific location (e.g., by pixel) of the at least one gaze location, and comparing the at least one gaze location with at least one user interface (UI) element (e.g., a key on a virtual keyboard, a button in a web browser, a URL link, etc.) displayed at the same or similar pixel location within the user interface. In some example aspects, the at least one UI element may comprise a virtual key representing a character on a virtual keyboard. In this case, the at least one gaze location detected by the eye-gaze tracker hardware may be determined to fall within a rectangular boundary defining a virtual key, while other gaze locations may fall just outside the rectangular boundary of the virtual key. Method 200 may aggregate gaze locations received over a period of time (e.g., 250 milliseconds, 500 milliseconds, 1 second, or any other suitable period) and may determine which UI element is associated with the aggregated gaze locations at associate operation 206. In other aspects, a statistical distribution of gaze locations received over a period of time may be evaluated. The associate operation 206 may determine a relative proximity of the received gaze locations to one or more UI elements. For example, the received gaze locations may be concentrated in and around a certain virtual key, but not all of the received gaze locations may actually be inside a boundary of the virtual key. Even so, gaze locations falling outside of the boundary may still be in close proximity to the virtual key. Gaze locations falling outside of the boundary may also be compared with other gaze locations received within the same period of time. If the majority of other gaze locations received at about the same time falls within the boundary of the virtual key, it may be determined that the gaze locations falling outside of the boundary should still be associated with the virtual key. In this way, scattered gaze locations inherently associated with eye jitter may be accounted for.

In other example aspects, the UI element may comprise a button in a web browser or hyperlink in an application. Other UI elements may include scroll bars, dropdown controls, radio buttons, check boxes, search or other text input fields, and the like. In this case, received gaze locations may be analyzed and associated with such UI elements in the same or similar way that received gaze locations are associated with a virtual key on a virtual keyboard. In further example aspects, the eye-gaze of the user may be complimented by a small physical motion. For example, in assistive use cases, a user may have enough capability to execute a button press, touch, switch, sip-n-puff, head switch, etc. Such physical motions may be used in determining which UI element should be associated with the eye gaze of the user.

At apply operation 208, a machine-learning algorithm may be applied to the at least one gaze location (or, a corresponding UI element) to determine a predicted response associated with the at least one gaze location. A prediction processor (e.g., prediction processor 300 of FIG. 3) may comprise elements of a natural-language processor. For example, the prediction processor may comprise a tokenization engine, a feature extraction engine, a domain classification engine, a semantic determination engine, and a word generator engine. The feature extraction engine may communicate with local and/or remote databases that comprise lexical feature data, such as a dictionary of word n-grams, and contextual feature data, such as historical typing patterns and topical data related to a string of messages. Additionally, the prediction processor may reference statistical models during processing. The statistical models may rank common words associated with certain letters and contexts, for example. In some example aspects, e.g., where the user is not interfacing with a virtual keyboard but with one or more other UI elements, the prediction processor may not utilize all of the engines of the natural-language processor. Rather, the prediction processor may process the eye-gaze input by considering historical gaze locations on a certain webpage, historical click-log data from the user and/or a community of users, or other data. The apply operation 208 is described in further detail with reference to FIG. 3.

In further example aspects, a new word context may be started if the current editing context is empty, i.e., the user has completed typing a word, phrase or sentence, based on detecting that the user entered a preceding space, period, comma, or other punctuation. For example, if the current editing context is empty, the machine-learning algorithm of operation 208 may determine that a user has completed typing a word, phrase, or sentence. Operation 208 may also determine that a word, phrase, or sentence has been completed when the user glances at a non-alphabetic character, such as a punctuation mark or preceding space. Upon detection of a non-alphabetic character mark, operation 208 may determine that a user desires to enter a new word, and a new word context may commence. In other example aspects, the completion of a word may be inferred when a user glances at a non-alphabetic character, such as the spacebar, period, comma, or other punctuation.

In yet other example aspects, in an eye-gaze editing environment, where there is often a separation between the keyboard region and non-keyboard region, operation 208 may determine that a user intends to begin a word or end a word by detecting that the eye-gaze location is inside or outside the virtual keyboard region, respectively. For example, if the eye gaze of a user moves outside of the keyboard region, the machine-learning algorithm(s) may infer that the user has completed typing a word, phrase, or sentence. While the eye gaze of the user remains within the keyboard region, the machine-learning algorithm(s) may assume that the user is still inputting a word, phrase, or sentence.

Operation 208 may also rely on slight physical movements of the user to determine begin-word or end-word markers. For example, in assistive use cases, a small physical movement by the user, such as a button press, or a touch, or a switch, or a sip-n-puff, or head switch, etc., may assist the machine-learning algorithms in determining whether the user has started or completed typing a word, phrase, or sentence.

In some example aspects, the system may not use end-word markers at all and may rely completely on end-sentence markers. In this case, natural-language processing and machine-learning techniques can be used to identify where the spaces ought to be inserted. Operation 208 may parse the continuous string using machine-learning algorithm(s), a dictionary, previous textual contexts related to the user, etc., to determine where spaces and/or delineating marks should be inputted. For example, the continuous string of "Hellomynameisjohn" may be parsed by the algorithm(s) in operation 208 to read as "Hello, my name is John."

At provide operation 210, at least one predicted response may be displayed or otherwise provided (e.g., via audio prompt) via a user interface. The at least one predicted response may take the form of a suggested word or a suggested action associated with a UI element (e.g., scroll up, scroll down, etc.). In the example aspect where the associated UI element is a virtual key of a virtual keyboard, a predicted word may be presented to the user after the eye-gaze input is processed. In other example aspects, a plurality of predicted words may be provided to the user, which may or may not be ranked according to a likelihood that each predicted word was intended by the user. In other example aspects, e.g., where the associated UI element is associated with some action, the predicted response provided in operation 210 may be a suggested action, such as a suggestion to redirect to a new webpage (e.g., where the associated UI element is a hyperlink), or a suggestion to send a message (e.g., where the associated UI element is a send button), or a suggestion to auto-correct a typing mistake in a search engine application, etc. Other predicted responses may be determined by method 200 according to the interfacing application, available UI elements, context, etc.

At receive indication operation 212, an indication may be received from the user. The indication may comprise accepting or rejecting the at least one predicted response, providing additional input (e.g., a gaze location associated with a different virtual key of a virtual keyboard), and the like. For example, a user who is interfacing with a virtual keyboard may receive one or more predicted words from the intelligent eye-gaze response system disclosed herein, and the user may elect to discard the one or more predicted words. Upon receiving an indication to discard the one or more predicted words, the intelligent eye-gaze response system may update at least one machine-learning algorithm. The indication may then be used to further train the one or more machine-learning algorithm(s) utilized by the intelligent eye-gaze response system. Other data that may be used to update such machine-learning algorithms includes but is not limited to the at least one gaze location, the at least one associated UI element, the at least one predicted response from the prediction processor, and the action performed.

At perform operation 214, at least one action may be performed based on the indication. For example, upon acceptance of a predicted word, the action may comprise typing the word (e.g., in a document, message, search field, etc.). Alternatively, upon acceptance of a suggested action (e.g., scroll up), the action may be performed. Alternatively still, upon rejection of a predicted word, the prediction processor may further analyze the at least one gaze location (or the associated UI element) to identify one or more alternative predicted responses, or the system may request additional user input (e.g., additional eye-gaze input). Other actions are possible and the above-described actions are not intended to be limiting.

As should be appreciated, the various methods, devices, components, etc., described with respect to FIG. 2 are not intended to limit method 200 to being performed by the particular components described. Accordingly, additional topology configurations may be used to practice the methods and systems herein and/or components described may be excluded without departing from the methods and systems disclosed herein.

Figure 3:
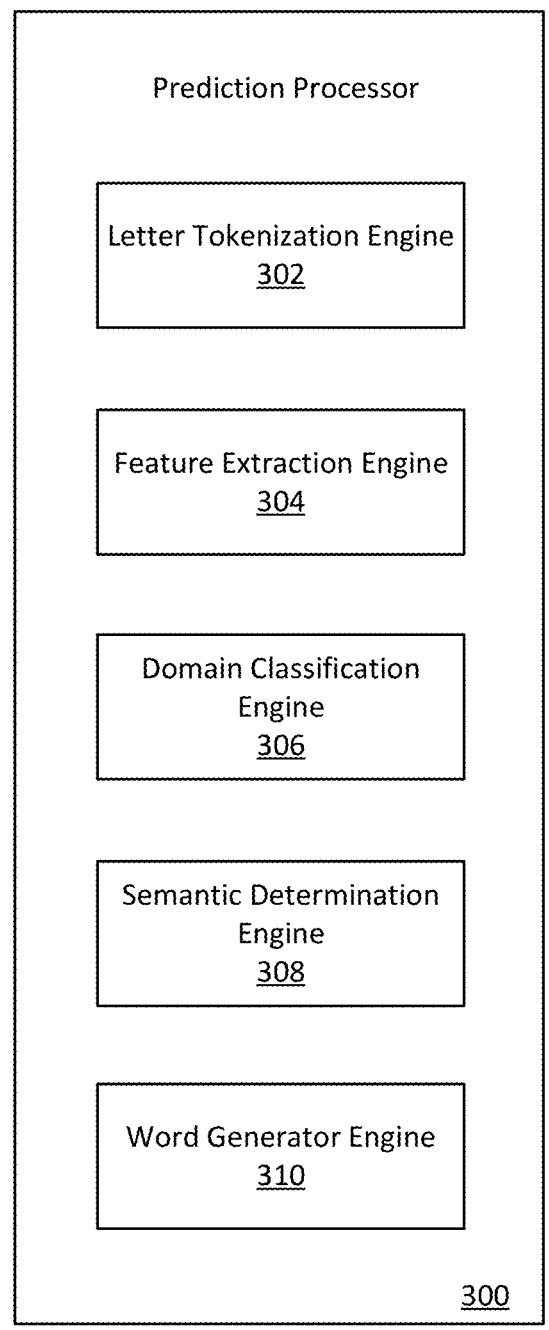
FIG. 3 is a block diagram illustrating a prediction processor.

FIG. 3 is a block diagram illustrating a prediction processor.

Prediction processor 300 may be configured to receive eye-gaze input (e.g., one or more gaze locations) and/or associated UI elements (e.g., one or more virtual keys representing characters). For example, prediction processor 300 may be configured to receive eye-gaze locations that are determined to be associated with (e.g., in proximity to) specific virtual keys on a virtual keyboard. In other example aspects, prediction processor 300 may be configured to receive eye-gaze locations that are determined to be associated with web browser UI elements (e.g., buttons, scroll bars, and the like). Other examples of UI elements are possible, as discussed above, and the examples provided are not intended to be limiting.

Upon receiving eye-gaze locations associated with one or more characters on a virtual keyboard, prediction processor 300 may send that data to the letter tokenization engine 302. The letter tokenization engine 302 may be configured to receive a sequence of letters and split the sequence of letters up into pieces, called tokens. A token may refer to an instance of a sequence of characters that are grouped together as a useful semantic unit for processing. The tokenization engine 302 may rely on statistical models to split the sequence of letters into known subsets that may be identified and interpreted more easily. For example, one tokenization model may split all non-alphanumeric characters (e.g., O'Neill becomes "o" and "neill" tokens). In other example aspects, the prediction processor 300 may also receive previously inputted text to further determine a context of the desired word. The letter tokenization engine 302 may split the previously inputted text by word and either consider or ignore punctuation.

Feature extraction engine 304 may be configured to analyze the various tokens in conjunction with both lexical features and contextual features. The feature extraction engine 304 may be configured to communicate with local and/or remote databases that house lexical features, such as a dictionary of common word n-grams. These n-grams may be compared against the various tokens (e.g., at least one character or a sequences of characters). Regarding contextual features, the feature extraction engine 304 may be configured to communicate with multiple databases of historical data, such as historical user-specific typing patterns, community-based typing patterns, message history, social media profiles, and any other relevant information. For example, in an electronic mail application, a contextual feature database may include a certain message chain. If a user is replying to the message chain, the feature extraction engine 304 may reference that contextual feature database with the stored message chain to determine the proper context of the message and ultimately aid prediction processor 300 in predicting an intended word or action of the user.

Domain classification engine 306 may consider the lexical and contextual features from feature extraction engine 304 in determining a domain for classifying the intended word or action. For example, the domain classification engine 306 may use the contextual features of a text message conversation to determine that a certain intended word belongs in a "social" domain. In one example aspect, a text conversation may be related to plans for Friday night. The domain classification engine 306 may receive this contextual information from feature extraction engine 304. As a result, the preceding text input of "Do you want to see a _____" may indicate that the next predicted word is directed to a "social" domain (e.g., "movie").

Semantic determination engine 308 may be configured to receive at least a portion of the previous processing data of the eye-gaze input, as well as communicate with local and/or remote databases that may include statistical models.

Semantic determination engine 308 may consider one or more candidate words according to the gaze locations and associated UI elements. The one or more candidate words may have been condensed during processing, e.g., by the feature extraction engine 304 and/or the domain classification engine 306. The remaining one or more candidate words may be analyzed by the semantic determination engine 308. The semantic determination engine 308 is configured to evaluate the context of the eye-gaze input. For example, the application in use may be considered (e.g., messaging application versus word-processing application); a previous message (or document) context and/or substance may be considered; a GPS location of the user may be considered; and the like. The semantic determination engine 308 may assess such data to determine a semantic meaning of an intended word. The semantic meaning may then be used to select a predicted word from the one or more candidate words according to the prior processing through the prediction processor. In some cases, the one or more candidate words may be ranked by the semantic determination engine 308 (or an independent ranking engine, not shown). In aspects, ranking may include associating each of the one or more candidate words with a likelihood (or probability) that the candidate word is the word intended by the user.

Word generator engine 310 may be configured to receive the semantic data and/or data from the other engines in order to determine and provide at least one predicted response to the user. In some cases, word generator engine 310 may present a plurality of predicted responses, which may or may not be provided in ranked order. The word generator engine 310 may reference a dictionary of n-grams to ensure that the one or more predicted responses (e.g., predicted words or predicted actions) are contextually and lexically intelligent. The word generator engine 310 may also be configured to provide (visually display, provide via audio prompt, etc.) the one or more predicted responses to the user via a user interface of an electronic device.

As should be appreciated, the various methods, devices, components, etc., described with respect to FIG. 3 are not intended to limit systems 300 to being performed by the particular components described. Accordingly, additional topology configurations may be used to practice the methods and systems herein and/or components described may be excluded without departing from the methods and systems disclosed herein.

Figure 4A:
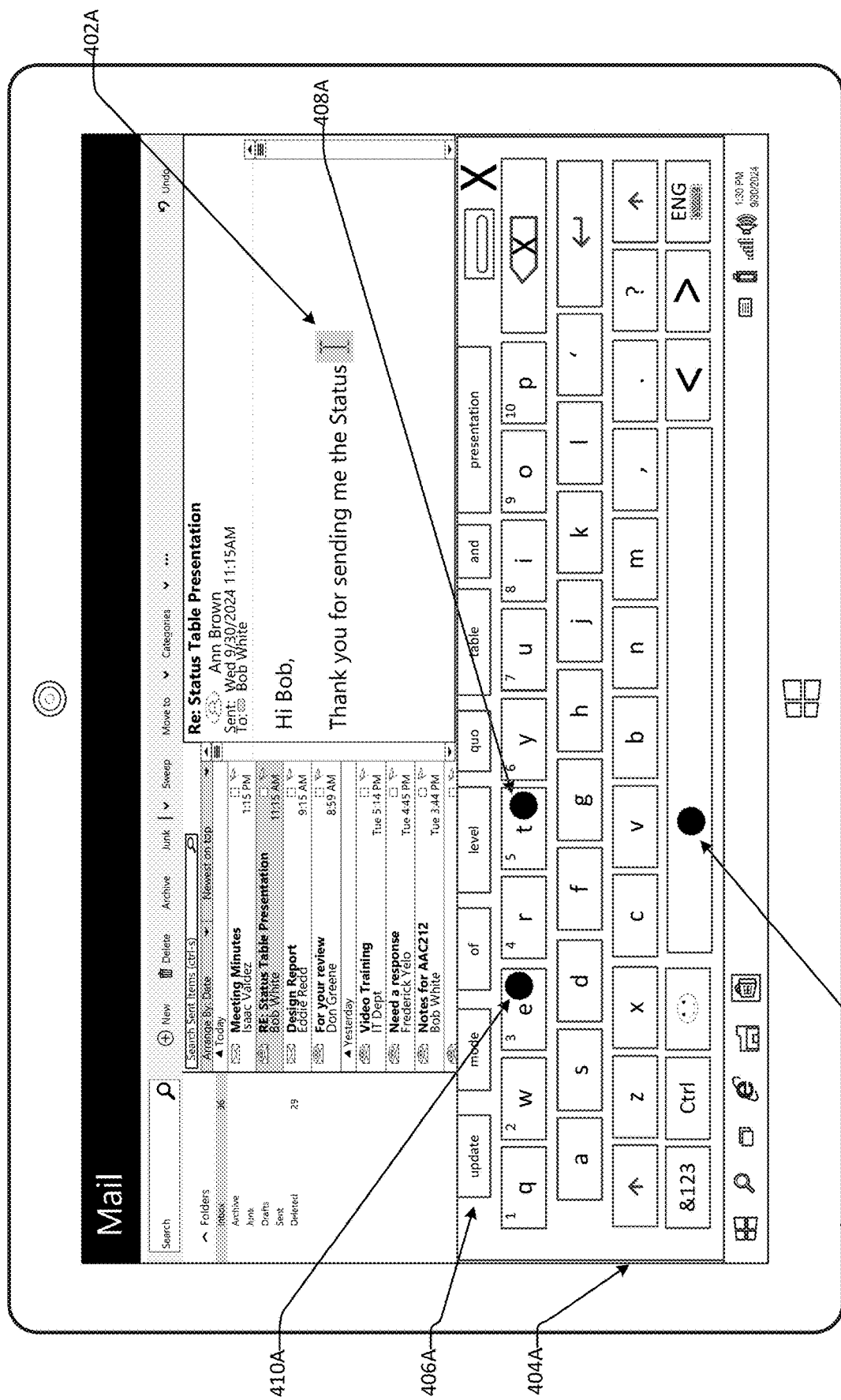
FIG. 4A illustrates an example of an intelligent eye-gaze response, where a word is predicted according to the first and last letter.

FIG. 4A illustrates an example of an intelligent eye-gaze response system, where a word is predicted according to the first and last letter.

As illustrated, electronic device 400 may be running an electronic mail application. The user may be in the process of eye-typing the next word using eye-gaze technology at cursor position 402A. The user may look at virtual keyboard 404A and glance at the first and last letters (or characters) of a word the user intends to type. Rather than fixating on certain keys to reach a certain dwell time, the intelligent eye-gaze response system disclosed herein may allow the user to glance (e.g., for a short period of time) at the first and last letters of the desired word. In still other examples, as described above, other signals may identify word markers, such as but not limited to: starting a new word context if the editing context is empty; continuing a word if the previous character is alphanumeric; completing a word if the user glances at the spacebar, period, comma or other punctuation; in an editing environment, identifying begin-word and end-word markers when the user's glance enters and exits the keyboard region, respectively; in assistive use cases, identifying begin-word and end-word markers when slight physical motions are detected; in a text-to-speech environment, identifying an end-sentence marker in response to the play button of an Augmentative and Alternative Communication (AAC) application; or using only end-sentence markers, identifying where word spacing should occur based on natural-language processing and machine-learning techniques.

Based on processing described with respect to FIG. 3, the intelligent eye-gaze response system may present one or more predicted responses (e.g., one or more predicted words) to the user. For example, the user may be in the process of typing "Thank you for sending me the Status _____." The intended word following "status" may be "table." As such, the user may look at virtual keyboard 404A, glance to a first gaze location associated with virtual key 408A, glance to a second gaze location associated with virtual key 410A, and then glance to a third gaze location associated with spacebar key 412A. Virtual key 408A may represent the character "t," and virtual key 410A may represent the character "e." In this case, those characters are the first and last letters of the word "table."

After glancing at virtual keys 408A and 410A, the user may glance at spacebar key 412A to indicate to the intelligent eye-gaze response system that the user has entered the first and last letter of the intended word. In some example aspects, the virtual keys 408A, 410A, and 412A may be associated with numerous gaze locations according to pixel coordinates. The black dots may denote a plurality of gaze locations (e.g., a cluster of gaze locations), as described above. The intelligent eye-gaze response system disclosed herein may receive the gaze locations, associate UI elements (e.g., virtual keys representing characters) to those gaze locations, and proceed to send that data to the prediction processor, as describe in FIG. 3.

In some example aspects, the intelligent typing and response system may dynamically suggest words in the suggestion bar 406A without any eye-gaze input. Based on contextual clues and statistical models, suggestion bar 406A may suggest one or more predicted words that may logically follow the previous word or words. In this case, a user desiring to type "table" may simply glance to the suggested word "table" in the suggestion bar 406A, rather than gazing at virtual keys 408A and 410A. In other aspects, upon processing the eye-gaze input associated with virtual keys 408A and 410A, the intelligent eye-gaze response system may display one or more predicted words in suggestion bar 406A (e.g., table, tape, telephone, etc.). Either or both of the one or more suggested words or the one or more predicted words may be ranked based on a probability that each word is the intended word.

Figure 4B:
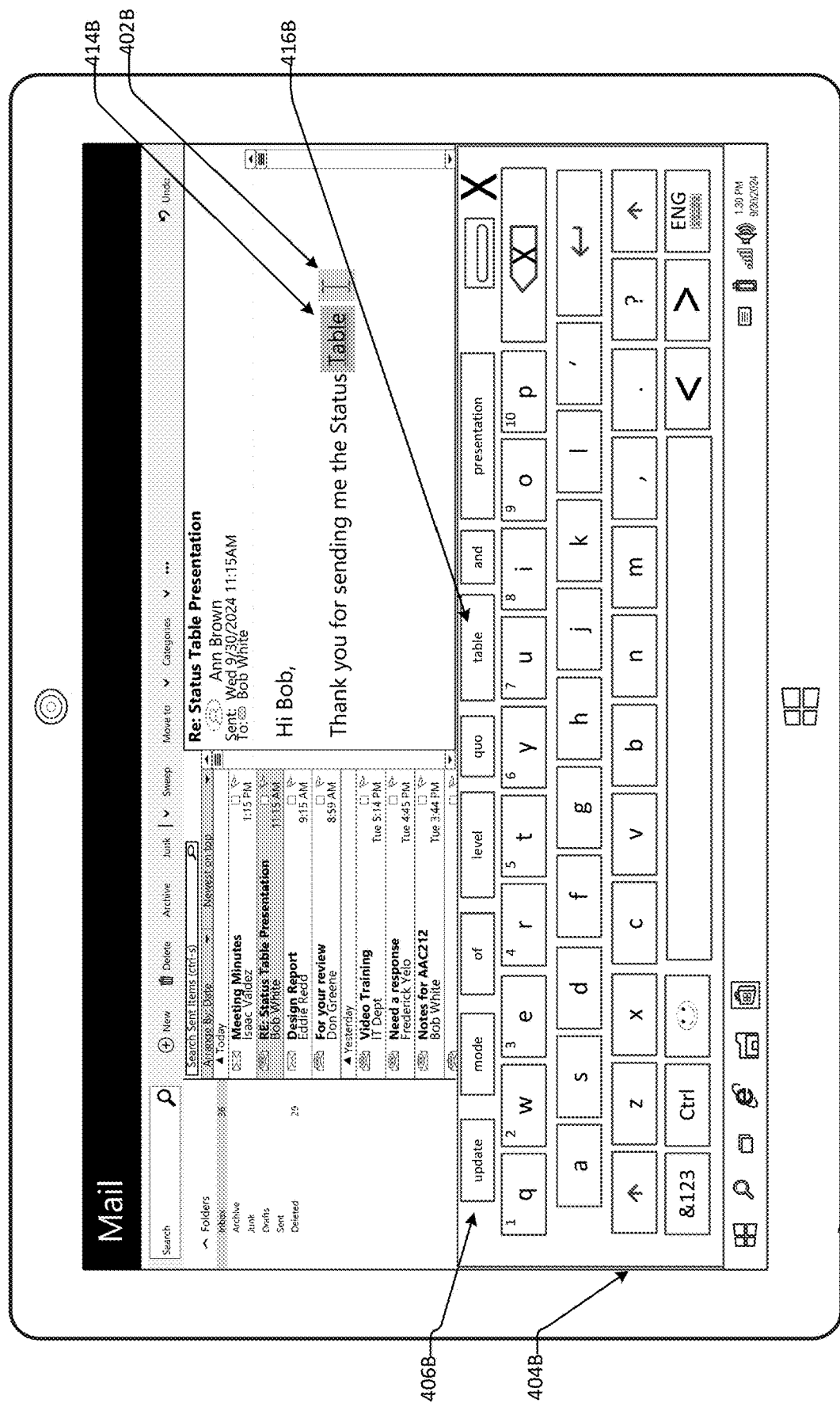
FIG. 4B illustrates an example output in response to intelligent eye gaze processing.

FIG. 4B illustrates an example output of an intelligent eye-gaze response system.

In aspects, the intelligent eye-gaze response system disclosed herein may process the received gaze locations and the associated UI elements to provide a predicted word or words via an electronic device. For example, after staring at virtual keyboard 404B for a short period of time (e.g., without gazing at any particular virtual key), the system may present a suggested word 414B to the user (e.g., based on context or otherwise). To accept the suggested word, a user may simply wait until a certain duration of time passes, or the user may begin inputting the next word using eye-gaze. The subsequent input may then be displayed at cursor position 402B, after the suggested word 414B. In other example aspects, the user may select a suggested word from the suggestion bar 406B. As illustrated, the suggestion bar 406B contains suggested word 416B. Rather than typing the word using first and last letter eye-gaze typing, the user may simply glance at the suggested word 416B.

Figure 4C:
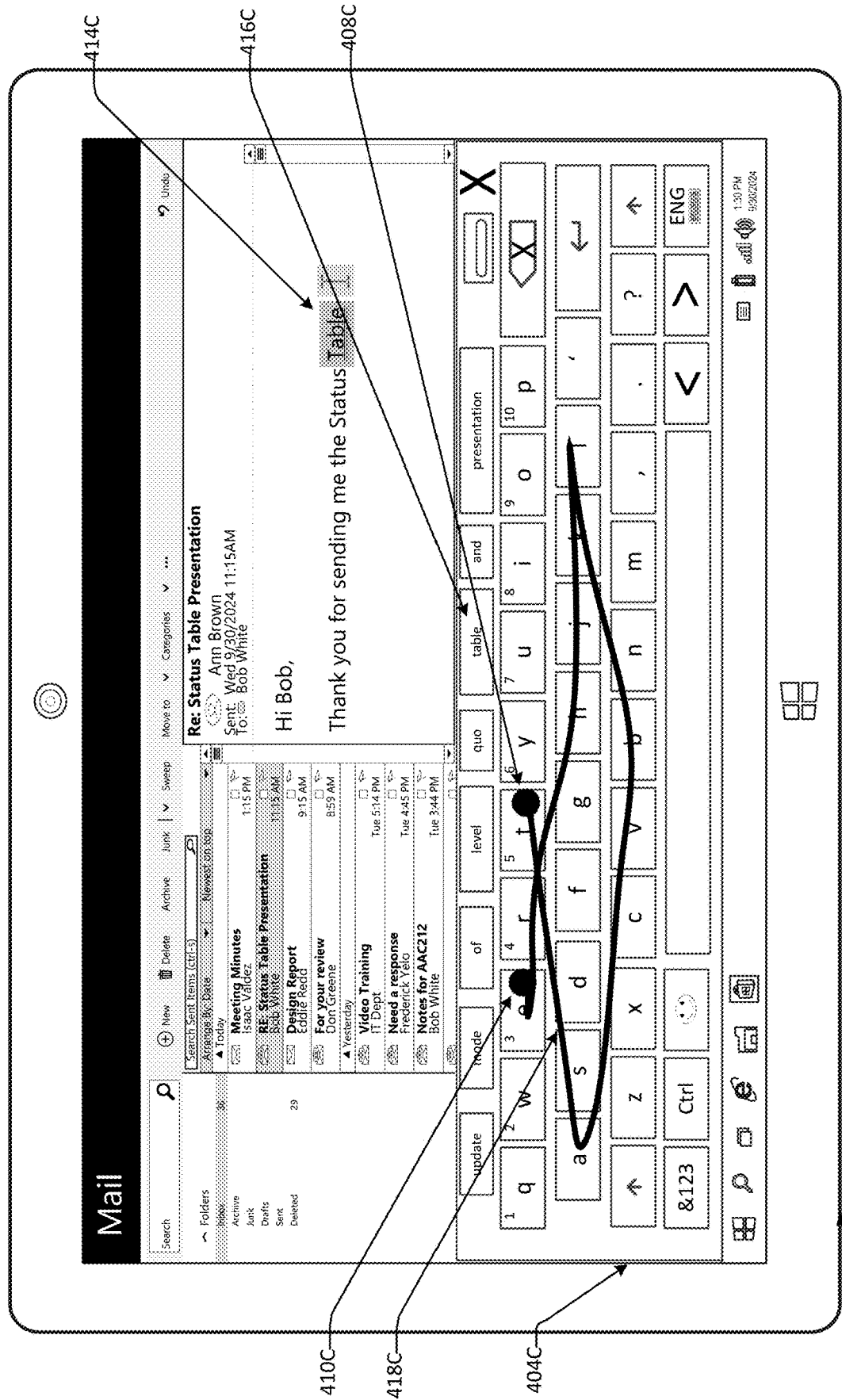
FIG. 4C illustrates an example of an intelligent eye-gaze response, where a word is predicted according to a gaze path.

FIG. 4C illustrates an example of an intelligent eye-gaze response, where a word is predicted according to a gaze path.

In other example aspects, the intelligent typing and response system may prompt the user to enter each character of a desired word. Rather than having to fixate on each character to reach a certain dwell time for input of that character, the user may quickly glance at each character in order to input the desired word. The user may gaze at virtual keyboard 404C, and proceed to trace a gaze path 418C. The gaze path 418C may begin with a first gaze location associated with a first virtual key 408C and end with a last gaze location associated with virtual key 410C. In some example aspects, the user may simply glance at the first virtual key 408C and the last virtual key 410C. In other example aspects, the intelligent eye-gaze response system may prompt the user to fixate slightly longer on the first and last virtual keys to indicate the start and end of the intended word. In still other aspects, as described further below, other techniques for disambiguating the beginning and end of a word may be employed. The gaze path may be identified by a continuous eye movement that traces over each intermediate virtual key of an intended word. The gaze path along with the series of gaze locations traced by the continuous eye movement and determined to be associated with the various intermediate virtual keys may be processed to determine one or more predicted words. In this case, while multiple candidate keys may be traversed by the gaze path, the most likely (probable) virtual keys may be determined and associated with the gaze path. After processing, at least one predicted word 414C may be displayed.

As should be appreciated, the various methods, devices, components, etc., described with respect to FIGS. 4A, 4B, and 4C are not intended to limit systems 400 to being performed by the particular components described. Accordingly, additional topology configurations may be used to practice the methods and systems herein and/or components described may be excluded without departing from the methods and systems disclosed herein.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, as described herein.

Figure 5:
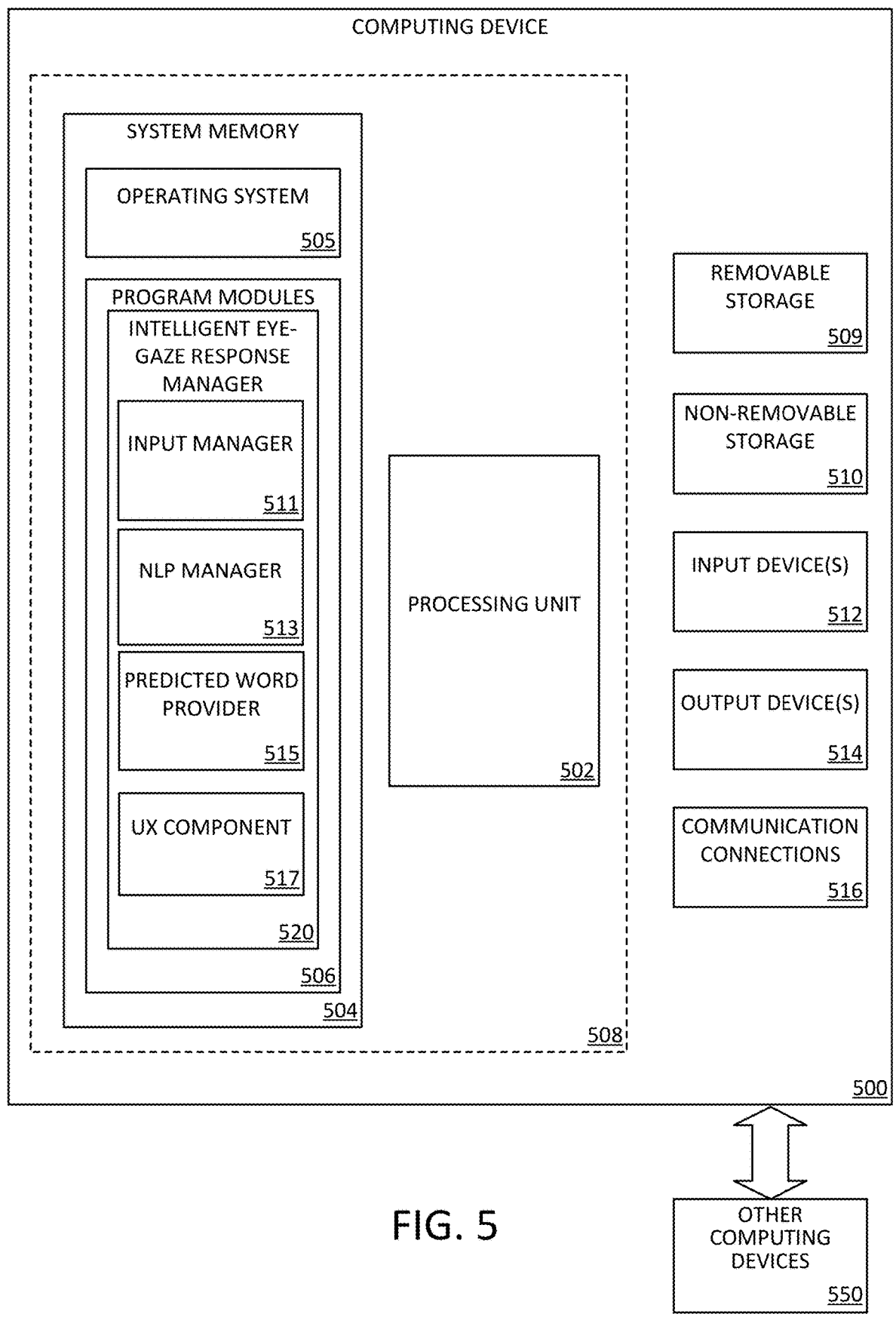
FIG. 5 is a block diagram illustrating example physical components of a computing device with which aspects of the disclosure may be practiced.

FIG. 5 is a block diagram illustrating example physical components (e.g., hardware) of a computing device 500 with which aspects of the disclosure may be practiced. The computing device components described below may have computer-executable instructions for implementing an intelligent eye-gaze typing manager 520 on a computing device (e.g., server computing device and/or client computing device). The computer-executable instructions for an intelligent eye-gaze typing manager 520 can be executed to implement the methods disclosed herein, including a method of receiving dwell-free eye-gaze typing input and providing at least one intelligently predicted word according to a prediction processor. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running an intelligent eye-gaze typing manager 520, such as one or more components with regard to FIGS. 1, 2, 3, 4A, 4B, and 4C, and, in particular, an input manager 511, a Natural Language Processor (NLP) manager 513, a predicted word provider 515, and/or UX Component 517.

The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., intelligent eye-gaze typing manager 520) may perform processes including, but not limited to, the aspects, as described herein. Other program modules that may be used in accordance with aspects of the present disclosure, and in particular for receiving dwell-free eye-gaze typing input and providing at least one intelligently predicted word according to a prediction processor, may include an input manager 511, an NLP manager 513, a predicted word provider 515, and/or UX Component 517, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include tangible storage media such as RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such tangible computer storage media may be part of the computing device 500. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
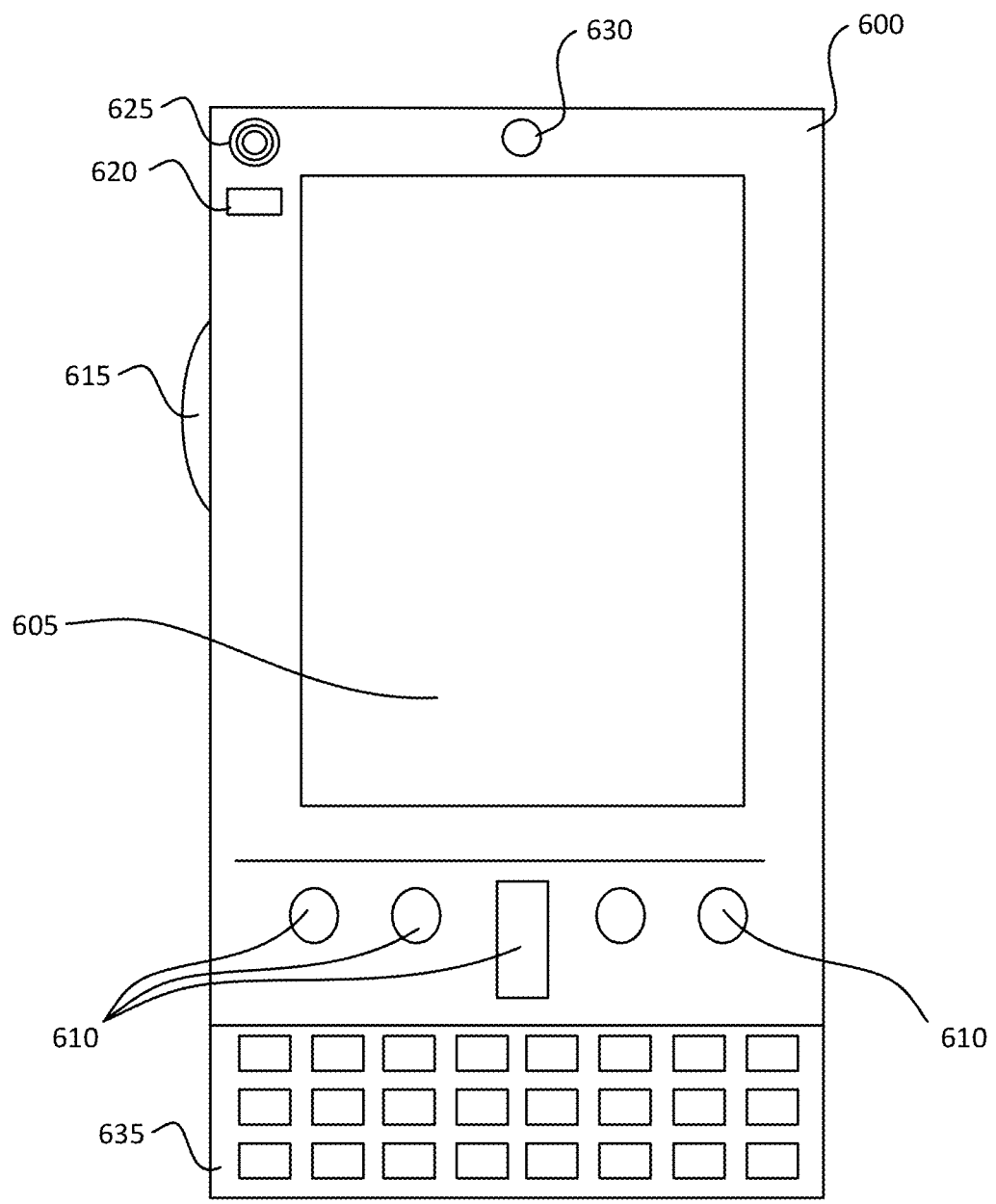
FIGS. 6A and 6B are simplified block diagrams of a mobile computing system in which aspects of the present disclosure may be practiced.
Figure 6B:
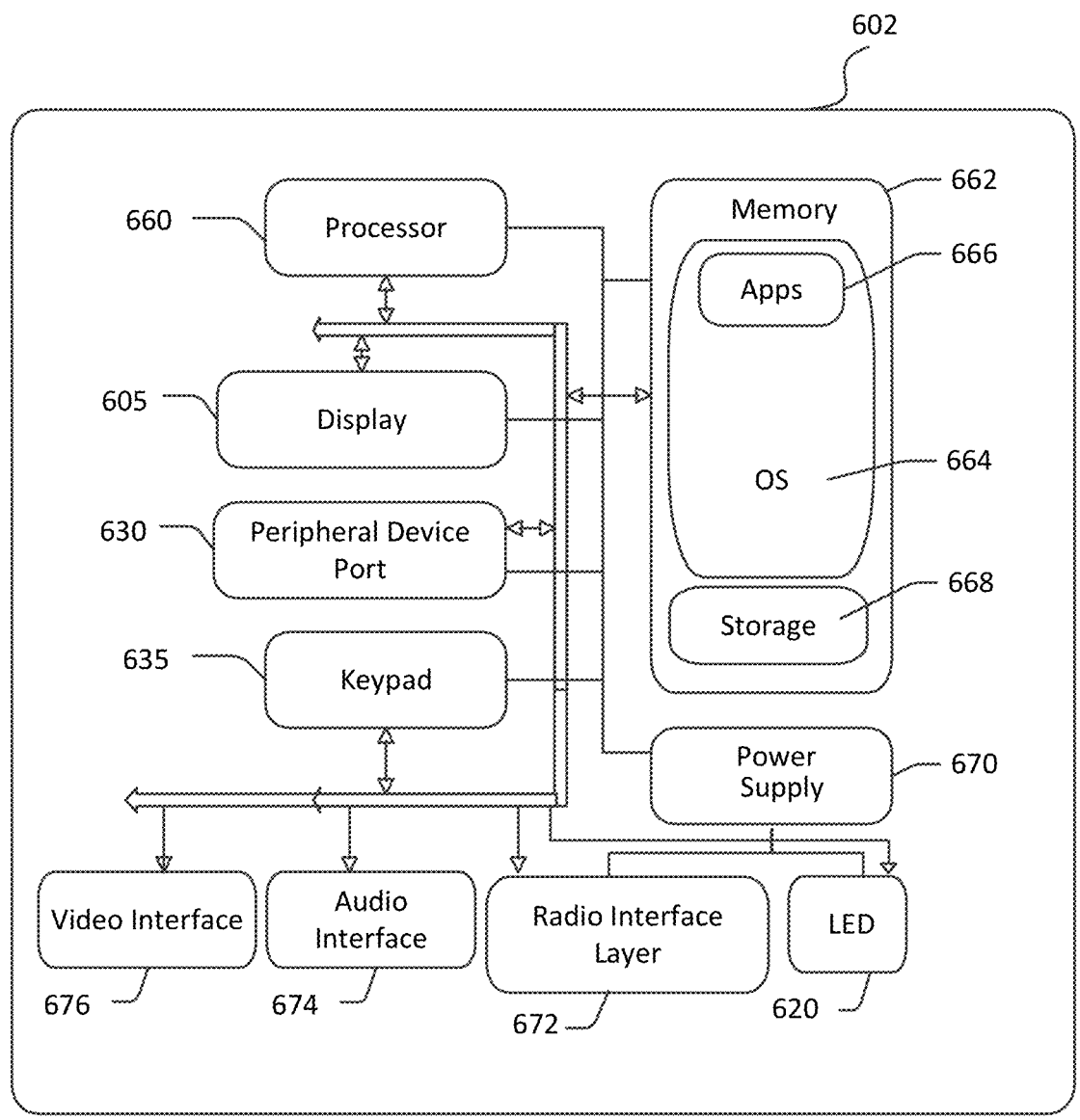

FIGS. 6A and 6B illustrate a mobile computing device 600, for example, a mobile telephone, a smart phone, wearable computer (such as a smart watch or head-mounted display for virtual reality applications), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for receiving dwell-free eye-gaze typing input and providing at least one intelligently predicted word according to a prediction processor as described herein (e.g., input manager 511, NLP manager 513, predicted word provider 515, and/or UX Component 517, etc.).

The system 602 has a power supply 670, which may be implemented as one or more batteries. The power supply 670 may further include an external power source, such as an AC adapter or a powered docking cradle that supplements or recharges the batteries. The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via an audio transducer 625 (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of peripheral device 630 (e.g., on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

As should be appreciated, FIGS. 6A and 6B are described for purposes of illustrating the present methods and systems and are not intended to limit the disclosure to a particular sequence of steps or a particular combination of hardware or software components.

Figure 7:
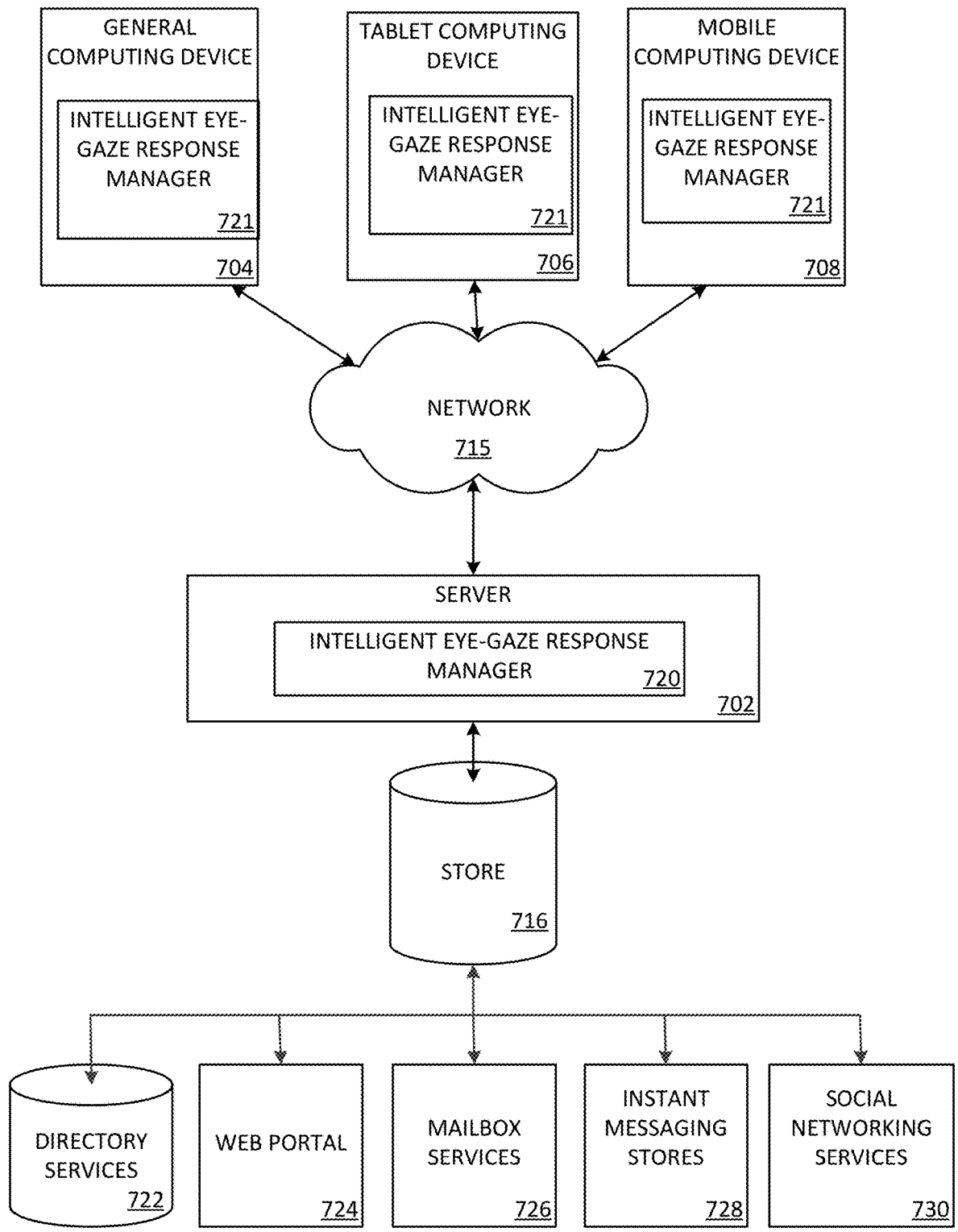
FIG. 7 is a simplified block diagram of a distributed computing system in which aspects of the present disclosure may be practiced.

FIG. 7 illustrates one aspect of the architecture of a system for processing data received at a computing system from a remote source, such as a general computing device 704 (e.g., personal computer), tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking service 730. The intelligent eye-gaze typing manager 721 may be employed by a client that communicates with server device 702, and/or the intelligent eye-gaze response manager 720 may be employed by server device 702. The server device 702 may provide data to and from a client computing device such as a general computing device 704, a tablet computing device 706 and/or a mobile computing device 708 (e.g., a smart phone) through a network 715. By way of example, the computer system described above with respect to FIGS. 1-6 may be embodied in a general computing device 704 (e.g., personal computer), a tablet computing device 706 and/or a mobile computing device 708 (e.g., a smart phone). Any of these embodiments of the computing devices may obtain content from the store 716, in addition to receiving graphical data useable to either be pre-processed at a graphic-originating system or post-processed at a receiving computing system.

As should be appreciated, FIG. 7 is described for purposes of illustrating the present methods and systems and is not intended to limit the disclosure to a particular sequence of steps or a particular combination of hardware or software components.

Figure 8:
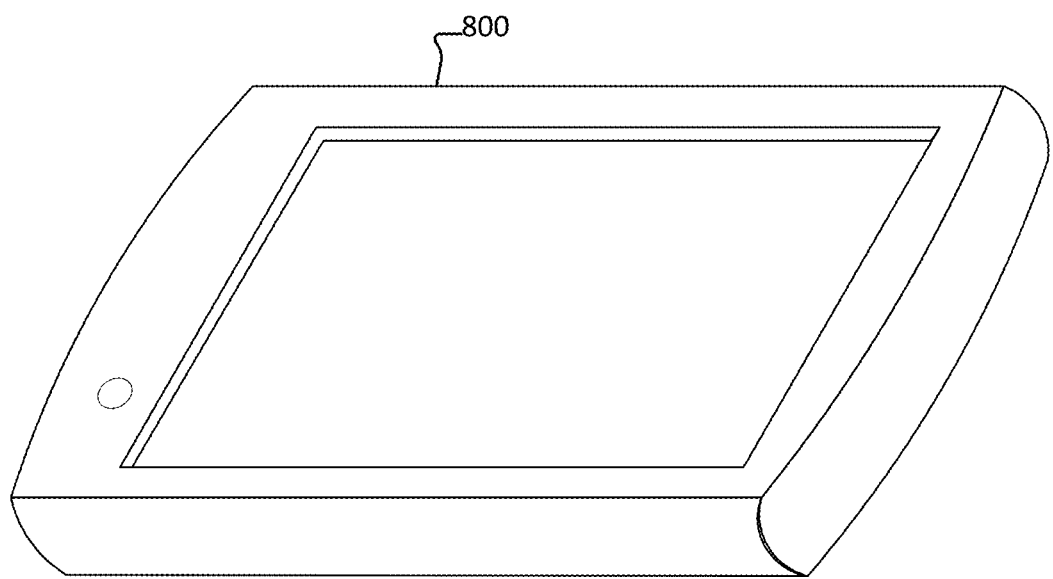
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 8 is described for purposes of illustrating the present methods and systems and is not intended to limit the disclosure to a particular sequence of steps or a particular combination of hardware or software components.

The embodiments of the disclosure described herein are implemented as logical steps in one or more computer systems. The logical operations of the present disclosure are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosure. Accordingly, the logical operations making up the embodiments of the disclosure described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the disclosure. Since many embodiments of the disclosure can be made without departing from the scope of the disclosure, the disclosure resides in the claims hereinafter appended. Furthermore, structural features of the different embodiments may be combined in yet another embodiment without departing from the recited claims.

What is claimed is:

1. A processor-implemented method comprising:
receiving a first eye-gaze input associated with a first gaze location on an electronic device, the first gaze location corresponding to a first letter of a word;
receiving a second eye-gaze input associated with a second gaze location on the electronic device, the second gaze location corresponding to a last letter of the word;
determining a predicted word based on the first letter of the word and the last letter of the word, the first letter of the word corresponding to a first letter of the predicted word and the last letter of the word corresponding to a last letter of the predicted word, wherein determining the predicted word comprises predicting additional letters between the first letter of the predicted word and the last letter of the predicted word;
causing a display of the predicted word on a user interface of the electronic device;
receiving an indication related to the predicted word; and
based on the indication, causing a performance of at least one action.

2. The processor-implemented method of claim 1, further comprising:
associating the first gaze location with a first UI element and the second gaze location with a second UI element.

3. The processor-implemented method of claim 2, wherein each of the first UI element and the second UI element comprise virtual keys of a virtual keyboard, and wherein the virtual keys represent characters.

4. The processor-implemented method of claim 2, wherein each of the first UI element and the second UI element comprise at least one of: a button, a scroll bar, a dropdown control, a radio button, or a check box.

5. The processor-implemented method of claim 4, wherein the indication comprises selection of at least one of the first UI element or the second UI element, and wherein the action is associated with the at least one of the first UI element or the second UI element.

6. The processor-implemented method of claim 5, wherein the action comprises at least one of: navigation within a page, navigation to another page, display of a dropdown menu, display of a text box, executing a search, receiving an approval, receiving an acceptance, receiving a selection, or making a submission.

7. The processor-implemented method of claim 1, wherein the first gaze location and the second gaze location fall along a gaze path.

8. The processor-implemented method of claim 7, further comprising:
based on the gaze path, associating the first gaze location and the second gaze location with a first UI element and a second UI element respectively.

9. The processor-implemented method of claim 8, wherein each of the first UI element and the second UI element comprise virtual keys of a virtual keyboard.

10. The processor-implemented method of claim 1, further comprising:
updating a machine-learning algorithm with the predicted word based, at least in part, on the received indication.

11. The processor-implemented method of claim 1, further comprising:
determining a plurality of predicted words;
ranking the plurality of predicted words; and
providing the plurality of predicted words in order of the ranking.

12. A computing device comprising:
a processing unit; and
a memory storing processor-executable instructions that, when executed by the processing unit, cause the computing device to:
receive a first eye-gaze input associated with a first gaze location on the computing device, the first gaze location corresponding to a first letter of a word;
receive a second eye-gaze input associated with a second gaze location on the computing device, the second gaze location corresponding to a last letter of the word;
determine a predicted word based on the first letter of the word and the last letter of the word, the first letter of the word corresponds to a first letter of the predicted word and the last letter of the word corresponding to a last letter of the predicted word, wherein determining the predicted word comprises predicting additional letters between the first letter of the predicted word and the last letter of the predicted word;
cause a display of the predicted word;
receive an indication related to the predicted word; and
based on the indication, perform at least one action.

13. The computing device of claim 12, wherein the processor-executable instructions further cause the computing device to:
associate the first gaze location with a first UI element and the second gaze location with a second UI element, wherein each of the first UI element and the second UI element comprise virtual keys of a virtual keyboard, and wherein the virtual keys represent characters.

14. The computing device of claim 13, wherein each of the first UI element and the second UI element comprise at least one of: a button, a dropdown control, a radio button, or a check box.

15. The computing device of claim 14, wherein the indication comprises selection of one or more of the first UI element or the second UI element and wherein the action is associated with the one or more of the first UI element or the second UI element.

16. The computing device of claim 15, wherein the action comprises at least one of: navigation within a page, navigation to another page, display of a dropdown menu, display of a text box, executing a search, receiving an approval, receiving an acceptance, receiving a selection, or making a submission.

17. A non-transitory computer storage medium storing instructions that, when executed by one or more processors of a computing device, perform a method comprising:
receiving a first eye-gaze input associated with a first gaze location on the computing device, the first gaze location corresponding to a first letter of a word;
receiving a second eye-gaze input associated with a second gaze location on the computing device, the second gaze location corresponding to a last letter of the word;
determining a predicted word based on the first letter of the word and the last letter of the word, the first letter of the word corresponding to a first letter of the predicted word and the last letter of the word corresponding to a last letter of the predicted word, wherein determining the predicted word comprises predicting additional letters between the first letter of the predicted word and the last letter of the predicted word;
displaying the predicted word;
receiving an indication related to the predicted word; and
based on the indication, performing at least one action.

18. The non-transitory computer storage medium of claim 17, wherein the at least one action comprises at least one of: navigation within a page, navigation to another page, display of a dropdown menu, display of a text box, executing a search, receiving an approval, receiving an acceptance, receiving a selection, or making a submission.

19. The non-transitory computer storage medium of claim 17, further comprising instructions for determining a path between the first gaze location and the second gaze location.

20. The non-transitory computer storage medium of claim 19, further comprising instructions for determining another letter of the predicted word based, at least in part, on the path.

\* \* \* \* \*